Patented Apr. 2, 1940

2,195,418

UNITED STATES PATENT OFFICE 2,195,418

WETTING, WASHING, DISPERSING, AND PENETRATING AGENTS AND THE METHOD OF PRODUCING THE SAME

Ernst Alfred Mauersberger, Maarssen, Netherlands, assignor, by mesne assignments, to American Hyalsol Corporation, Wilmington, Del., a corporation of Delaware No Drawing. Application January 28, 1936, Serial No. 61,179

5 Claims. (Cl. 260—458)

My invention relates to improved washing, wetting, dispersing and penetrating agents and to the method of producing the same from higher molecular aliphatic alcohols.

The sulfonation products of high molecular aliphatic alcohols, primarily of those alcohols containing 14 and more carbon atoms in the molecule, have certain disadvantages. They are either wholly insoluble or but difficultly soluble in cold water, the solubility decreasing very strongly with the increase in the number of carbon atoms present. Ceryl sulfonate, for example, is insoluble in cold water and cetyl sulfonate can only be dissolved in cold water with extreme difficulty. The sulfonates of the high molecular alcohols, such as ceryl and carnaubyl alcohols, and of the alcohol obtained by the oxidation of paraffines, the sulfonation of which is difficult in itself because of their high melting points, yield only turbid solutions even in the presence of heat. The stability of the sulfonates against acids and alkalies is but limited and not sufficient for various purposes.

The principal object of my invention is to obviate the defects and disadvantages above referred to. I accomplish this object and obtain strongly capillary active products by first subjecting high molecular, aliphatic, saturated or unsaturated alcohols having more than 10 carbon atoms, particularly univalent alcohols, to strong halogenation, preferably chlorination, then treating the chlorinated or otherwise halogenated compounds with active sulfonating agents in the presence of heat, as a result of which the hydrogen chloride is liberated and the chlorine atoms are wholly or partly substituted by sulphuric acid ester groups. When unsaturated alcohols are used as starting materials, such chlorine atoms as attach to the unsaturated bonds are also substituted by a sulphuric acid ester group.

I use, as starting materials, the naturally occurring alcohols such as are present in the solid and fluid waxes, and the synthetic alcohols such as are obtained, for example, by reduction of fatty acids or by oxidation of hydrocarbons, both types of alcohols having at least eleven carbon atoms in the molecule.

The halogenating step, or more specifically the chlorinating step, is effected in a manner well known in this art, as for example by passing chlorine in the presence of heat into the molten, dissolved or dispersed alcohols. I may, if desired, carry out the reaction with the aid of catalysts or halogen carriers or in the sunlight.

As a general thing, no more than two atoms of chlorine are taken up by the alcohol. Dependent upon the temperature and quantities of chlorine employed, either monochlorides or dichlorides of the alcohols are formed with the simultaneous liberation of hydrogen chloride, and dependent upon the reaction conditions the hydroxyl group is partly esterified with hydrogen chloride. If it be desired to avoid such esterification, it is advisable to effect previous esterification of the alcohols with a weak acid such as phosphoric acid, boric acid, silicic acid or the like.

I have found, surprisingly, that the absorbed chlorine or other halogen atoms may be quantitatively substituted by sulfonic acid groups if the chlorinated alcohols are treated with an excess of concentrated anhydrous sulfonating agents in the presence of heat, for an appreciable length of time and the mass is energetically stirred. As sulfonating agents I prefer to use concentrated sulphuric acid, monohydrate or fuming sulphuric acid (oleum). The resulting reaction products are then treated in the usual manner.

The new products of my invention are distinguished from the sulfonates of higher molecular aliphatic alcohols obtained in the usual or customary manner by their greater content of sulphuric acid, their greater hydrophylic properties, readier solubility in cold water, better wetting properties, foaming effects and greater stability to salts, alkalines and acids. The new products may also be bleached pure white by suitable treatment with hydrogen peroxide, hypochlorite solutions or chlorine.

Example 1

100 parts of technical cetyl alcohol obtained from sperm cake and having the following characteristics:

Melting point _____ 43° C.
Specific gravity _____ 0.810 at 60° C.
Iodine number _____ 18
Acetyl number _____ 196 are dispersed with 125 parts of warm or hot water at 45° C. Finely divided chlorine is passed into the dispersion, in the sunlight, until the weight of the mixture increases from 225 kg. to 285 kg., whereupon the mixture is heated to about 60° C. and the aqueous liquid, which consists of about a 12% hydrochloric acid, is separated from the chlorinated cetyl alcohol. By effecting the chlorination in the presence of water, no condensation products are formed nor is the hydroxyl group appreciably esterified. The chlorinated cetyl alcohol is washed twice with hot water and thereupon dried in vacuo. By this precedure, I obtain about 125 kg. of chlorinated product which consists, in the main, of monochlor cetyl alcohol in addition to the dichlor compound and which has the following properties:

Hardening point_____ 26.5° C.
Specific gravity_____ 0.975 at 50° C.
Iodine number_____ about 3
Acetyl number_____ 194 upon one hour's saponification with ½ normal alcoholic KOH To 100 kg. of this chlorinated product at a temperature of 50° C. add slowly over a period of two hours 100 kg. of monohydrate, stirring vigorously during the operation. The temperature rises to 60° C. At the start the monohydrate does not dissolve in the chlorinated alcohol and it is for this reason that an intimate admixture must be brought about by vigorous stirring or agitation. The substitution of the chlorine groups by the sulphuric acid ester groups is accompanied by liberation of corresponding quantities of hydrochloric acid gas. At the same time the hydroxyl group is esterified with sulphuric acid. After introduction of the sluphuric acid, stirring is continued for twelve hours and a current of dry air is passed through the mass to expel the dissolved hydrochloric acid.

The reaction product dissolves very readily in cold water and the solution is entirely clear. It is cooled to 25° C. and allowed to stand at this temperature for about twelve hours, the sulfuric acid which separates out being drawn off. Thereupon 40 kg. finely broken ice is introduced into the product with constant stirring and the color changes to a grayish white. The mass is then neutralized with a suitable alkaline liquid, as for example a 20% caustic soda solution, and may be bleached pure white with hydrogen peroxide or sodium hypochlorite solution.

*Example 2*

100 kg. of an alcohol obtained by oxidizing soft paraffin are esterified with 10 kg. of boric acid. Chlorine is passed at 40 to 70° C. into 100 kg. of this ester until the weight increases to about 125 kg. Thereupon any hydrochloric acid gas still present in the ester is expelled therefrom by air. The resulting chlorinated boric acid ester is treated at 50° to 65° C. with 80% of its own weight of monohydrate, vigorous stirring being effected. In this procedure large quantities of hydrochloric acid gas are liberated. Then the reaction product is stirred at the same temperature for about an additional twelve hours and further treated as described in Example 1. The resulting product is a white, readily soluble paste which may be dried to form a white powder.

In lieu of using alcohol recovered from soft paraffin I obtain like results by the treatment under like conditions of lauric alcohol obtained by high pressure hydrogenation of lauric acid.

I claim:
1. A method of producing wetting, washing, dispersing and penetrating agents from aliphatic alcohols containing no less than eleven carbon atoms in the molecule, which method comprises the steps of esterifying the alcohol with boric acid, chlorinating the esterified alcohol by reacting the same with chlorine, thereby replacing at least one hydrogen atom in the chain by a chlorine atom without impairing the boric acid radical, and energetically stirring the resulting product for about 6 to 12 hours at a temperature of about 50° to 65° C. with an excess of an anhydrous sulfonating agent whereby at least one of the substituted chlorine atoms and the boric acid radical are replaced by sulphuric acid ester groups.

2. A method of producing wetting, washing, dispersing and penetrating agents, which method comprises energetically stirring a chlorine-substituted aliphatic alcohol having at least eleven carbon atoms in the molecule for about 6 to 12 hours at a temperature of about 50° to 65° C. with an excess of an anhydrous sulfonating agent, whereby at least one of the substituted chlorine atoms and the original hydroxyl group are replaced by sulphuric acid ester groups.

3. A method of producing wetting, washing, dispersing and penetrating agents from aliphatic alcohols containing no less than eleven carbon atoms in the molecule, which method comprises the steps of esterifying the alcohol with a weak mineral acid, chlorinating the esterified alcohol by reacting the same with chlorine, thereby replacing at least one hydrogen atom in the chain by a chlorine atom without impairing the hydroxyl group previously esterified with said weak acid, and energetically stirring the resulting product for about 6 to 12 hours at a temperature of 50° to 65° C. with an excess of an anhydrous sulfonating agent, whereby at least one of the substituted chlorine atoms and the hydroxyl group are replaced by sulphuric acid ester groups.

4. The compound—

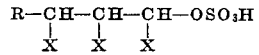

where R is an alkyl group having at least 8 carbon atoms, one X is a —OSO₃H group and the other X's are hydrogen atoms.

5. The compound—

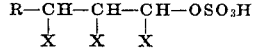

where R is an alkyl group having at least 8 carbon atoms, one X is a —OSO₃H group, one X is a chlorine atom, and the remaining X is a hydrogen atom.

ERNST ALFRED MAUERSBERGER.